US006931234B1

(12) United States Patent
Higashi

(10) Patent No.: US 6,931,234 B1
(45) Date of Patent: Aug. 16, 2005

(54) DATA PROCESSING DEVICE AND METHOD OF CONTROLLING OPERATION OF DATA PROCESSING DEVICE

(75) Inventor: Kunihiko Higashi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 871 days.

(21) Appl. No.: 09/628,829

(22) Filed: Jul. 31, 2000

(30) Foreign Application Priority Data

Jul. 30, 1999 (JP) .................................. 11-217395

(51) Int. Cl.[7] ............................................. H04B 17/00

(52) U.S. Cl. ............................... 455/67.11; 455/115.1; 455/115.3; 455/226.1; 455/226.2; 455/556.1; 455/557

(58) Field of Search ............................. 455/556.1, 557, 455/558; 235/462.45, 462.46; 361/736, 737

(56) References Cited

U.S. PATENT DOCUMENTS

| 5,287,113 | A   |   | 2/1994  | Meier            |         |
|-----------|-----|---|---------|------------------|---------|
| 5,929,414 | A   |   | 7/1999  | Saitoh           |         |
| 6,095,423 | A   | * | 8/2000  | Houdeau et al.   | 235/487 |
| 6,213,402 | B1  | * | 4/2001  | Reiner           | 235/492 |
| 6,288,904 | B1  | * | 9/2001  | Houdeau et al.   | 361/760 |
| 6,375,082 | B1  | * | 4/2002  | Kobayashi et al. | 235/492 |
| 6,492,717 | B1  | * | 12/2002 | Gore et al.      | 257/679 |

FOREIGN PATENT DOCUMENTS

| FR | 2772534     | 6/1999  |
|----|-------------|---------|
| JP | 3-209592    | 9/1991  |
| JP | 4-3282      | 1/1992  |
| JP | 5-274496    | 10/1993 |
| JP | 8-123583    | 5/1996  |
| JP | 10-124626   | 5/1998  |
| JP | 11-25232    | 1/1999  |
| JP | 2000-113148 | 4/2000  |
| JP | 3349998     | 9/2002  |
| WO | 99/16018    | 4/1999  |

OTHER PUBLICATIONS

Copy of Japanese Office Action dated Feb. 12, 2003 (and English translation of relevant portion).

* cited by examiner

Primary Examiner—Temica M. Beamer
(74) Attorney, Agent, or Firm—Dickstein, Shapiro, Morin & Oshinsky, LLP.

(57) ABSTRACT

A data processing device such as an IC card is switchable between a terminal mode in which drive electric power and signals are supplied via exposed connection terminals and an RF mode in which drive electric power and signals are supplied via built-in antennas. The data processing device has an internal circuit for being supplied with drive electric power and signals from either the connection terminals or the antennas depending on the mode to which the internal circuit has been set. The internal circuit typically comprises a microprocessor. The data processing device also has a mode detector for setting the internal circuit to the RF mode in response to a predetermined radio wave applied to the antennas and setting the internal circuit to the terminal mode in response to a reset signal applied to a reset terminal which is one of the connection terminals.

13 Claims, 6 Drawing Sheets

DATA PROCESSING DEVICE AND METHOD OF CONTROLLING OPERATION OF DATA PROCESSING DEVICE

BACKGROUND OF THE INVENTION

1. Field of the Invention

The present invention relates to a data processing device such as an IC (Integrated Circuit) card, and more particularly to a data processing device having a connection terminal for a wired connection and an antenna for a radio connection and switchable between the use of the connection terminal and the use of the antenna, and a method of controlling operation of the data processing device.

2. Description of the Related Art

IC cards are available as one type of portable data processing devices. IC cards are widely used in many applications as prepaid cards for public telephone sets, identification cards for entering and leaving rooms, and mediums for electronic money. An IC card comprises an integrated circuit made up of a microprocessor, a memory, etc. and embedded in a plastic card. There have been developed three types of IC cards, i.e., contact cards, contactless cards, and combined cards, that are selectively used depending on the form of signal and power transmission to and from an external circuit.

The contact IC cards have a plurality of exposed connection terminals. When a contact IC card is inserted into a card reader, the connection terminals of the contact IC card are brought into direct contact with connection terminals of the card reader. The card reader and the contact IC card are now electrically connected to each other, allowing drive electric power to be supplied from the card reader to the contact IC card and also allowing various signals to be transmitted between the card reader and the contact IC card, so that the microprocessor in the contact IC card can process data.

The contactless IC cards have a radio antenna rather than exposed connection terminals. The radio antenna is used to send various signals to and receive various signals from the card reader via a radio wave or electromagnetic wave. The radio wave from the card reader is also used to send electric power as well as signals to the contactless IC card. The IC card extracts the signals and the drive electric power from the radio wave that is received by the antenna.

The combined IC cards have a combination of the functions of contact and contactless IC cards. The combined IC cards have both a plurality of exposed connection terminals and an antenna. A combined IC card is selectively operable in two switchable modes, i.e., a terminal mode in which it operates in the same manner as the contact IC card and an RF (Radio Frequency) mode in which it operates in the same manner as the contactless IC card.

The contact IC card provides better security than the contactless IC card because signals are exchanged between itself and the card reader through a wired connection. The contactless IC card can be handled more easily than the contact IC card since the contactless IC card is not required to be inserted into the card reader. The combined IC card can be handled easily and provides high security as it can transmit data requiring less security via a contactless connection.

As described above, the combined IC card needs to be switched between the terminal mode and the RF mode. Japanese laid-open patent publication No. 3-209592 (JP, 03209592, A) discloses that the voltage level of drive electric power applied to one of connection terminals and the voltage level of drive electric power extracted from a radio wave supplied from the antenna are compared with each other, and one of the terminal mode and the RF mode is selected based on the result of the comparison. Since the voltage levels are generally compared with each other by an analog circuit such as a comparator for mode switching, the mode switching process is performed under analog control. The mode switching process under analog control is problematic in that it is not a clear-cut process. Specifically, control conditions for mode switching tend to vary due to errors and variations in diffusing conditions in the fabrication of semiconductor integrated circuits contained in the combined IC card.

In actual usage of the combined IC card, when electromagnetic noise is received by the antenna, the mode of operation of the combined IC card may possibly switch to the RF mode unexpectedly. If the user, not knowing that the combined IC card is in the RF mode, inserts the combined IC card into a terminal-mode card reader, then the combined IC card may possibly malfunction. Alternatively, even if the combined IC card inserted in a terminal-mode card reader normally operates in the terminal mode, the mode of operation of the combined IC card may switch to the RF mode due to extraneous electromagnetic noise, causing the combined IC card to suffer malfunctioning.

In order to prevent such malfunctioning, the combined IC cards are designed with care not to operate with radio inputs that do not meet IC card standards. However, because a portable terminal-mode card reader is available in the art, a combined IC card thus designed may still be caused to malfunction when the user inserts the combined IC card into such a portable terminal-mode card reader that is carried by the user, without recognizing the presence of an RF-mode card reader that is installed nearby.

As described above, when an input is applied to the antenna of a combined IC card and an input is also applied to the connection terminals thereof at the same time, those simultaneously applied inputs may cause the IC card to malfunction and fail. The manufacturer of the combined IC card cannot identify the cause of such malfunctioning and failure because the manufacturer finds it difficult to confirm the environment in which the user uses the combined IC card.

In the RF mode, the combined IC card extracts drive electric power from a received radio wave. Therefore, when excessive electromagnetic noise is applied to the antenna, it may produce an unduly high drive voltage which tends to destroy the internal circuit of the IC card. One solution is to insert a shunt regulator in the supply path of drive electric power in the combined IC card. However, the shunt regulator is disadvantageous in that it wastes part of the drive electric power that is stably supplied from a connection terminal when the combined IC card is in the terminal mode.

General combined IC cards have an RF circuit for processing signals that are supplied via the antenna in the RF mode. The RF circuit has such characteristics that when the drive voltage thereof is higher, the communication range of the RF circuit is smaller. For this reason, if a combined IC card extracts a high drive voltage from a signal supplied via the antenna, then the high drive voltage is reduced to a predetermined voltage by a shunt regulator. The combined IC card has a common feeding path for drive electric power supplied from the antenna and drive electric power supplied from a connection terminal. Consequently, the shunt regulator causes an unnecessary voltage drop in the drive electric power supplied from the connection terminal. This problem may be solved by turning on the shunt regulator in the RF mode and turning off the shunt regulator in the terminal mode. However, it is difficult to protect the internal circuit of the combined IC card reliably while preventing an unnecessary voltage drop because extraneous electromagnetic noise may possibly be applied via the antenna while the combined IC card is operating in the terminal mode.

SUMMARY OF THE INVENTION

It is therefore an object of the present invention to provide a data processing device which is capable of switching between a terminal mode and an RF mode with a digital circuit only, can perform a clear-cut control process for switching between those two modes, and is less susceptible to the effect of manufacturing errors.

Another object of the present invention is to provide a data processing device which is capable of recording the occurrence of an input in a mode of operation while the data processing device is operating in another mode of operation.

Still another object of the present invention is to provide a data processing device which prevents an unnecessary voltage drop in drive electric power supplied from an external circuit, and reliably prevents an internal circuit from being destroyed by extraneous electromagnetic noise.

The above objects can be achieved by a data processing device comprising a plurality of connection terminals for establishing electric contact to receive signals and drive electric power, one of the connection terminals comprising a reset terminal, an antenna for receiving signals and drive electric power as a radio wave, data processing means switchable between a terminal mode for processing data based on an effective input signal applied to the connection terminals and an RF mode for processing data based on an effective input signal applied to the antenna, the data processing means being supplied with the signals and drive electric power from one of the connection terminals and the antenna depending on one of the terminal mode and the RF mode which is set, and mode switching means for setting the data processing means to the RF mode in response to a predetermined radio wave applied to the antenna and setting the data processing means to the terminal mode in response to a reset signal applied to the reset terminal.

The data processing device according to the present inventoin may typically comprise an IC card.

In the data processing device, the data processing means is set to the RF mode in response to a predetermined radio wave applied to the antenna, and is to the terminal mode in response to a reset signal applied via a wired connection to the reset terminal. The reset signal applied to the reset terminal can be detected without the need for an analog circuit such as a comparator for detecting a slight voltage difference. The switching between the modes of the data processing means can be achieved by a digital circuit only. Therefore, the data processing device has a clear-cut control process for switching between the two modes. Furthermore, the data processing device has operation characteristics prevented from varying due to errors and variations in the fabrication of integrated circuits contained in the data processing device.

The above and other objects, features, and advantages of the present invention will become apparent from the following description with reference to the accompanying drawings which illustrate an example of the present invention.

DESCRIPTION OF THE PREFERRED EMBODIMENT

Figure 1:
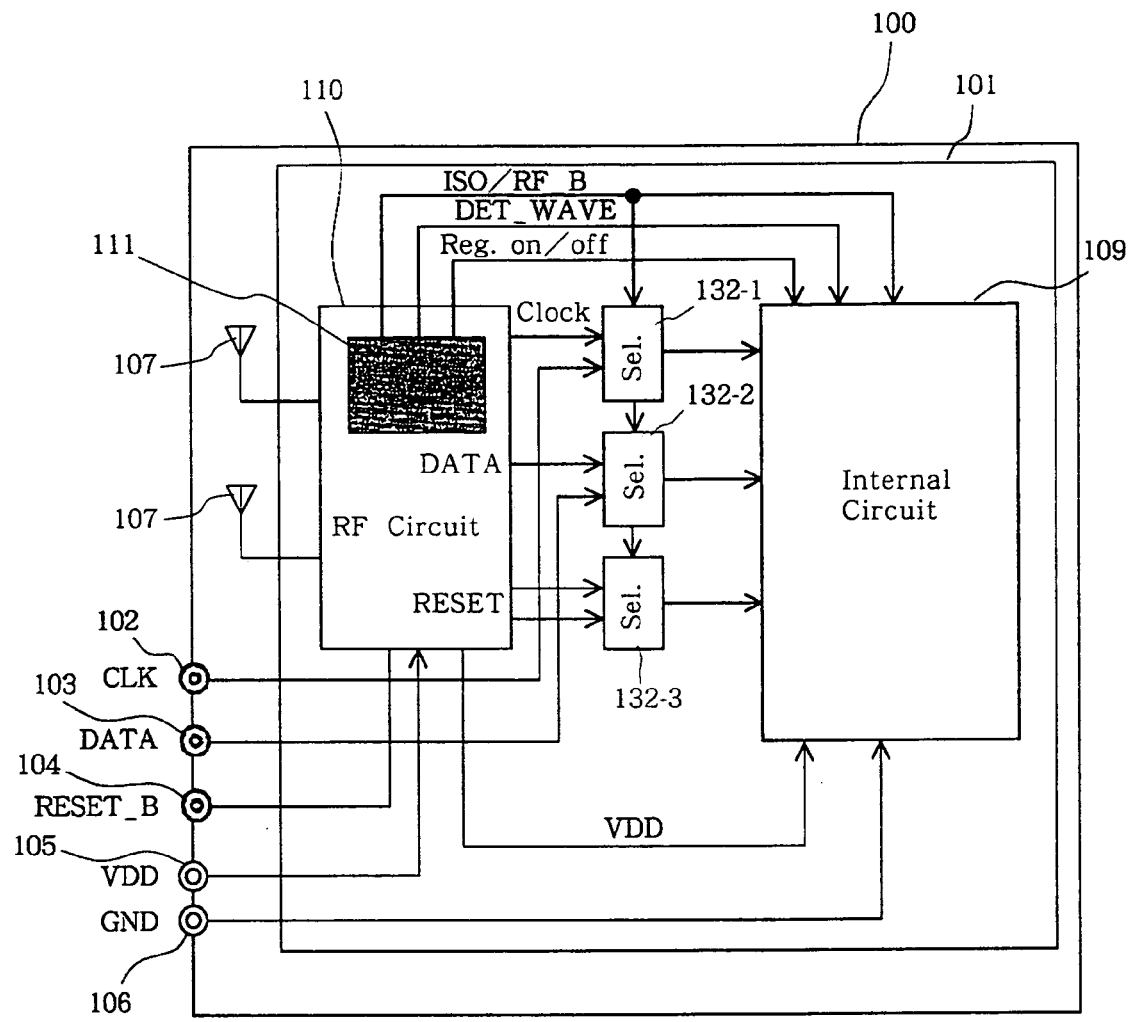
FIG. 1 is a block diagram of an overall circuit arrangement of an IC card according to a preferred embodiment of the present invention.

FIG. 1 shows IC card 100 constructed as a data processing device according to a preferred embodiment of the present invention. IC card 100 is a combined IC card that operates selectively in two modes, i.e., a terminal mode and an RF mode. IC card 100 is formed as a plastic card that is removably insertable in a card reader (not shown) that is used when IC card 100 is in the terminal mode. IC card 100 has microprocessor 101 as its main component. IC card 100 also has a plurality of connection terminals on an outer exposed surface thereof. When IC card 100 is inserted into a terminal-mode card reader, the connection terminals of IC card 100 are brought into contact with and electrically connected to respective connection terminals in the card reader. In FIG. 1, the connection terminals of IC card 100 include five connection terminals 102 to 106. Connection terminal 102 is supplied with clock signal "CLK", connection terminal 103 with processing data "DATA", connection terminal 104 with reset signal "RESET_B", connection terminal 105 with drive voltage "VDD", and connection terminal 106 with ground potential "GND". When IC card 100 is inserted into the terminal-mode card reader, connection terminals 102 to 106 of IC card 100 electrically contact the respective connection terminals in the card reader, so that drive electric power is supplied from the card reader to IC card 100 and various signals are exchanged between the card reader and IC card 100 through the established electric contact.

IC card 100 also has a pair of antennas 107, each comprising an inductive coil, for performing radio-wave communications with an RF-mode card reader (not shown). One of antennas 107 is connected to node A, whereas the other antenna 107 is connected to node B. A radio format used in the RF mode is in accordance with standards of ISO/IEC 14443-2 (ISO=International Standardization Organization; IEC=International Electrotechnical Commission), and contains a clock signal, processing data, and drive electric power that are superimposed.

IC card 100 has internal circuit 109 as a data processing means. Internal circuit 109 comprises a CPU (Central Processing Unit) and various peripheral circuits. Internal circuit 109 is energized by drive electric power supplied via the corresponding connection terminal or the corresponding antenna, and performs various data processing on various signals supplied via the corresponding connection terminal or the corresponding antenna.

Figure 2:
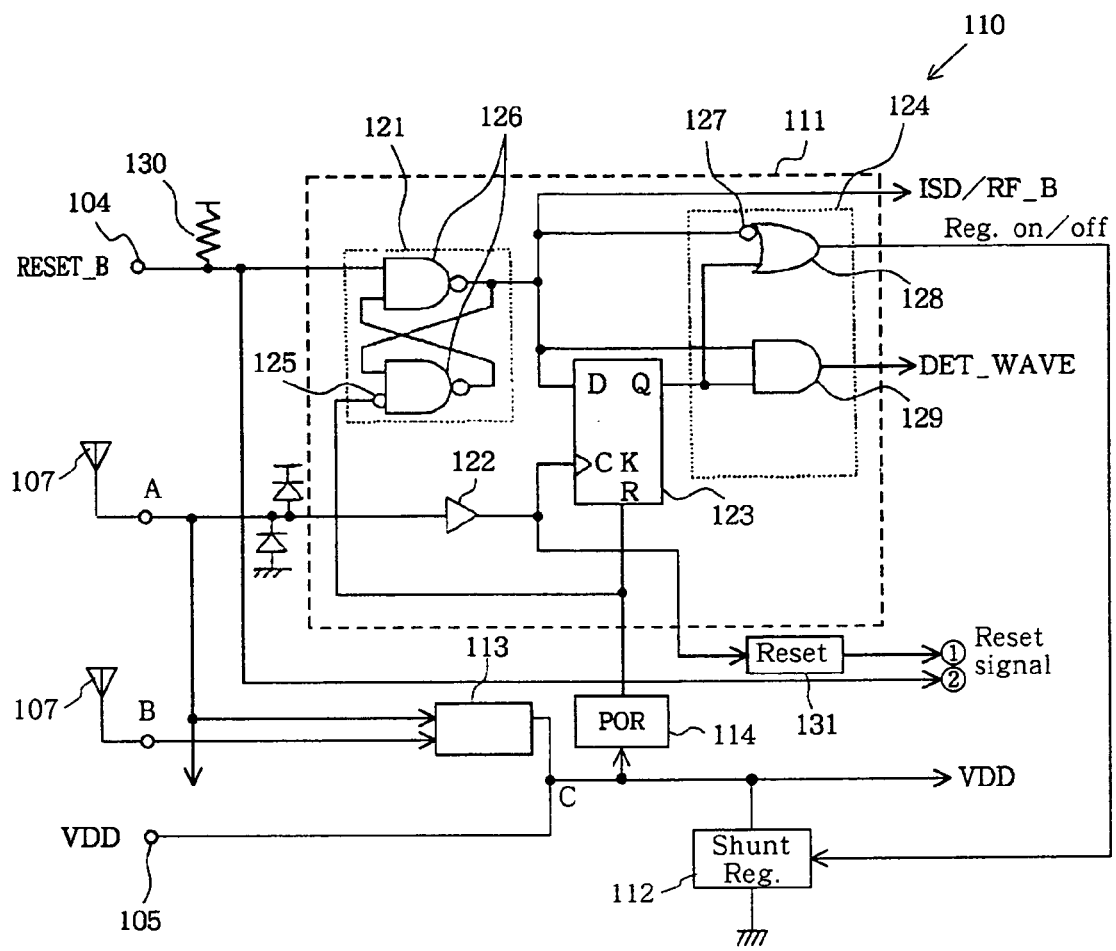
FIG. 2 is a block diagram of an RF circuit in the IC card shown in FIG. 1.

Antennas 107 are connected to RF circuit 110 which has, as shown in FIG. 2, mode detector 111 for switching between the modes, shunt regulator 112 for limiting electronic power, power extractor 113 for extracting electronic power, and POR (Power On Reset) circuit 114 for resetting the ovaeall circuits in IC card 100 when these circuits are turned on.

Figure 3:
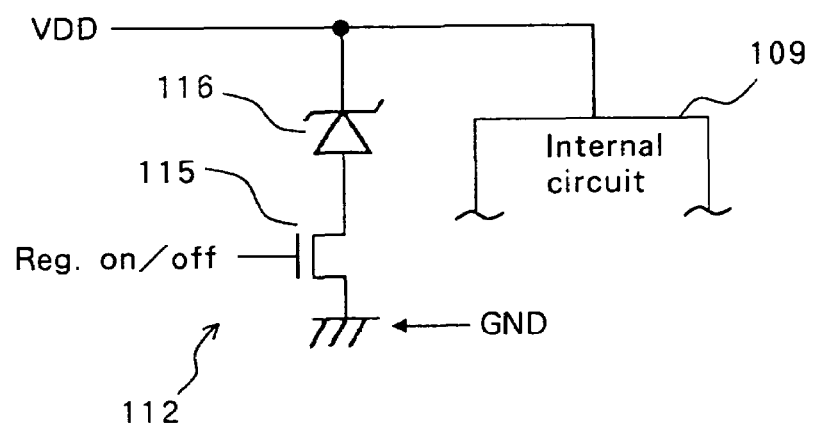
FIG. 3 is a circuit diagram of an equivalent circuit of a shunt regulator.

Power extractor 113 is connected to antennas 107, and extracts drive electric power from a radio wave supplied from each of antennas 107. Power extractor 113 has an output terminal connected to connection terminal 105 at node C connected to internal circuit 109, so that drive electric power extracted from a radio wave by power extractor 113 and drive electric power supplied via connection terminal 105 can be supplied to internal circuit 109. Shunt regulator 112 is inserted between node C and the ground, and lowers the voltage of the drive electric power extracted from a radio wave received by each of antennas 107 to a predetermined voltage. As shown in FIG. 3, shunt regulator 112 has regulator device 116 comprising a constant-voltage diode or the like and n-channel switching transistor 115 connected in series thereto. Shunt regulator 112 is switching into and out of operation by an on/off signal applied to the gate of n-channel switching transistor 115. When n-channel switching transistor 115 is not conductive, shunt regulator 112 does not operate, allowing the drive electric power applied to connection terminal 105 to be supplied directly to internal circuit 109.

As shown in FIG. 2, POR circuit 114 has an input terminal connected to node C. When the drive electric power applied from power extractor 113 or connection terminal 105 to POR circuit 114 reaches a predetermined voltage, POR circuit 114 outputs a POR signal which is a one-shot signal to mode detector 111.

Mode detector 111 comprises level detector 121, buffer 122 for extracting a clock signal, data holder 123, and decoder 124 for controlling a voltage limiting process.

Level detector 121 comprises inverter 125 and a pair of NAND gates 126 which make up an RS flip-flop. Level detector 121 is reset by a reset signal supplied from connection terminal 104 and the POR signal supplied from POR circuit 114, and outputs mode switching signal "ISO/RF_B" for internal circuit 109. Level detector 121 thus constructed changes the operation mode of internal circuit 109 to the RF mode in response to an input applied to antennas 107 and to the terminal mode in response to a reset signal applied to connection terminal 104.

More specifically, pull-up resistor 130 connected to a power line in IC card 100 is connected to connection terminal 104. When a resent signal as a "0" potential or a low potential is not applied from an external source to connection terminal 104, or connection terminal 104 itself is open, connection terminal 104 is maintained at a "1" potential or a high-level potential. Therefore, when the POR signal is applied to level detector 121 while a reset signal at "0" level is not being applied to connection terminal 104, level detector 121 outputs "0" as mode switching signal "ISO/RF_B", indicating the RF mode. When the reset signal at "0" level is applied to connection terminal 104 regardless of whether the POR signal is applied or not, level detector 121 outputs "1" as the mode switching signal "ISO/RF_B", indicating the terminal mode.

Buffer 122 amplifies a signal supplied from antenna 107 connected to node A and extracts a clock signal corresponding to the frequency of the supplied signal. Data holder 123, which comprises a D-type flip-flop, outputs the mode switching signal supplied from mode detector 121 each time the clock signal is supplied from buffer 122, and is reset when the POR signal is supplied from POR circuit 114. Although not shown, a clock signal and communication data to be supplied to internal circuit 109 are also extracted from antenna 107 connected to node A.

Decoder 124 comprises inverter 127, OR gate 128, and AND gate 129. Decoder 124 outputs on/off signal "Reg ON/OFF" for turning on and off shunt regulator 112 depending on mode switching signal "ISO/RF_B" supplied from level detector 121 and the data held by data holder 123. More specifically, when the RF mode is set by level detector 121, inverter 127 and OR gate 128 output an "on" signal to switching transistor 115 of shunt regulator 112, turning on shunt regulator 112. When the terminal mode is set, inverter 127 and OR gate 128 output an "off" signal to switching transistor 115, turning off shunt regulator 112. However, if a radio wave whose intensity level is in excess of a predetermined level is applied to antennas 107 when the terminal mode is set and inverter 127 and OR gate 128 output an "off" signal, then since buffer 122 generates a clock signal, the output signal from data holder 123 is inverted. At this time, mode switching signal "ISO/RF_B" remains to be "1" indicating the terminal mode, but on/off signal "Reg ON/OFF" is turned on, thus turning on shunt regulator 112 while internal circuit 109 remains in the terminal mode.

If a radio wave is applied to antennas 107 while no reset signal is applied to connection terminal 104, AND gate 129 of decoder 124 outputs "0" as input detecting signal "DET_WAVE" to internal circuit 109. Similarly, if a reset signal is applied to connection terminal 104 when no radio wave is applied to antennas 107, decoder 124 outputs "0" as input detecting signal "DET_WAVE". Conversely, if a radio wave is applied to antennas 107 when the terminal mode is set or if a reset signal is applied to connection terminal 104 when the RF mode is set, then decoder 124 outputs "1" as input detecting signal "DET_WAVE".

When decoder 124 operates in the manner described above, internal circuit 109 is capable of recognizing the occurrence of only an input supplied via antennas, the occurrence of only an input signal supplied via the connection terminal, the occurrence of an input signal supplied via the connection terminal during the occurrence of an input supplied via the antennas, and the occurrence of an input supplied via the antennas during the occurrence of an input signal supplied via the connection terminal, based on the combination of the operation mode set by mode switching signal "ISO/RF_B" and input detecting signal "DET_WAVE".

Reset signal generator 131 is connected to buffer 122. Reset signal generator 131 outputs a reset signal to internal circuit 109 when it is supplied with a clock signal extracted from a radio wave applied to antennas 107. Reset signal generator 131 cancels the outputting of the reset signal when, for example, it counts the clock signal to a predetermined count.

In IC card 100, as shown in FIG. 1, mode switching signal "ISO/RF_B" and input detecting signal "DET_WAVE" which are outputted from RF circuit 110 are transmitted directly to internal circuit 109. On/off signal "Reg ON/OFF" is transmitted to shunt regulator 112 (FIG. 2) and also transmitted directly to internal circuit 109. A clock signal supplied to internal circuit 109 is selected from a clock signal outputted by RF circuit 110 or from clock signal CLK applied to connection terminal 102 by selector 132-1. Selector 132-2 selects communication data outputted from RF circuit 110 or communication data supplied to connection terminal 103, and transmits the selected communication data to internal circuit 109. Selector 132-3 selects the reset signal outputted from reset circuit 131 in RF circuit 110 or the reset signal applied to connection terminal 104 and supplied via RF circuit 110, and transmits the selected reset signal to internal circuit 109. Each of these selectors 132-1 to 132-3 is controlled by mode switching signal "ISO/RF_B" outputted from RF circuit 110 to select and output one of the signal from RF circuit 110 and the signal from the connection terminal.

IC card 100 thus constructed can be switched between the two modes of operation, i.e., the RF mode and the terminal mode. In the RF mode, IC card 100 performs radio communications with an RF-mode card reader, i.e., a contactless card reader. In the terminal mode, IC card 100 is inserted into a terminal-mode card reader, i.e., a contact card reader, and performs communications therewith via wired transmission.

Figure 4:
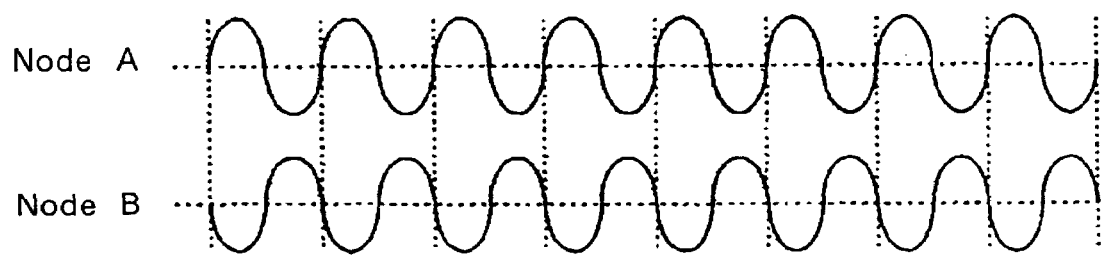
FIG. 4 is a diagram showing the waveforms of radio inputs applied to an antenna.
Figure 5:
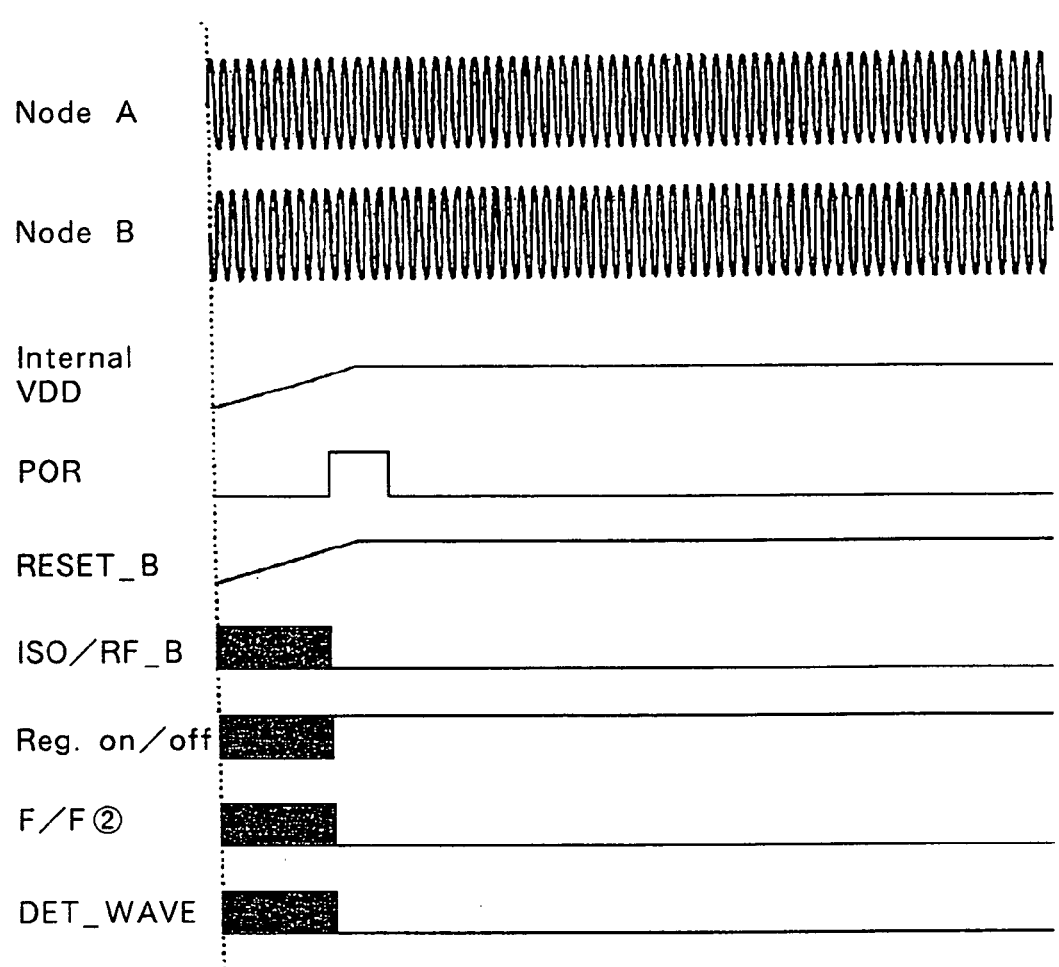
FIG. 5 is a timing chart of various signals when the IC card switches to an RF mode based on an input applied to the antenna.

Operation of IC card 100 in the RF mode will be described below. When IC card 100 is brought closely to the RF-mode card reader within a given distance therefrom, rather than being inserted into the terminal-mode card reader, no input signals are applied to connection terminals 102 to 106, but a radio input is applied to antennas 107. FIG. 4 shows the waveforms of signals at nodes A, B connected respectively to antennas 107.

When antennas 107 receive the radio wave, power extractor 113 extracts drive electric power from the radio wave. When the drive electric power reaches a predetermined voltage, POR circuit 114 outputs a POR signal in the form of a one-shot pulse to level detector 121. At this time, since a reset signal at "0" level is not applied from connection terminal 104 to level detector 121, level detector 121 outputs "0" as mode switching signal "ISO/RF_B", indicating the RF mode, to internal circuit 109 and selectors 132-1 to 132-3. The supplied mode switching signal sets the operation mode to the RF mode in internal circuit 109, and switches selectors 132-1 to 132-3 to a state for transmitting various signals outputted from RF circuit 110 in response to radio inputs to internal circuit 109.

Buffer 122 extracts a clock signal from the radio wave applied to one of antennas 107, and, in response to the extracted clock signal, reset signal generator 131 outputs a reset signal for the RF mode to internal circuit 109. Therefore, internal circuit 109 operating in the RF mode is reset by the reset signal.

The output signal from data holder 123 which is supplied with the above clock signal, the POR signal, and mode switching signal "ISO/RF_B" is maintained at "0", and the held data from data holder 123 and mode switching signal "ISO/RF_B" are applied to decoder 124. Decoder 124 applies on/off signal "Reg ON/OFF" to turn on shunt regulator 112 of internal circuit 109. Shunt regulator 112 which is turned on now lowers the voltage of the drive electric power extracted from the radio wave by power extractor 113 and supplied to internal circuit 109 to a predetermined voltage. Since decoder 124 outputs "0" as input detecting signal "DET_WAVE" to internal circuit 109, internal circuit 109 recognizes that no input signals are supplied to the connection terminals, but only an input is applied to the antennas, with the RF mode being set.

As described above, IC card 100 is set to the RF mode when a radio wave is applied to antennas 107 while no input signals are supplied to connection terminals 102 to 106. At this time, since internal circuit 109 recognizes that an input is supplied from the antennas, but no input signals are supplied from the connection terminals, IC card 100 reliably operates in the RF mode.

The RF-mode card reader supplies the drive electric power to internal circuit 109 of IC card 100 based on the radio wave. Since the drive electric power is supplied based on the radio wave, the supply of the drive electric power is not stable. However, because the voltage of the drive electric power in IC card 100 is kept at the predetermined voltage by shunt regulator 112, internal circuit 109 is protected against breakdown even when excessive electromagnetic noise is applied.

Figure 6:
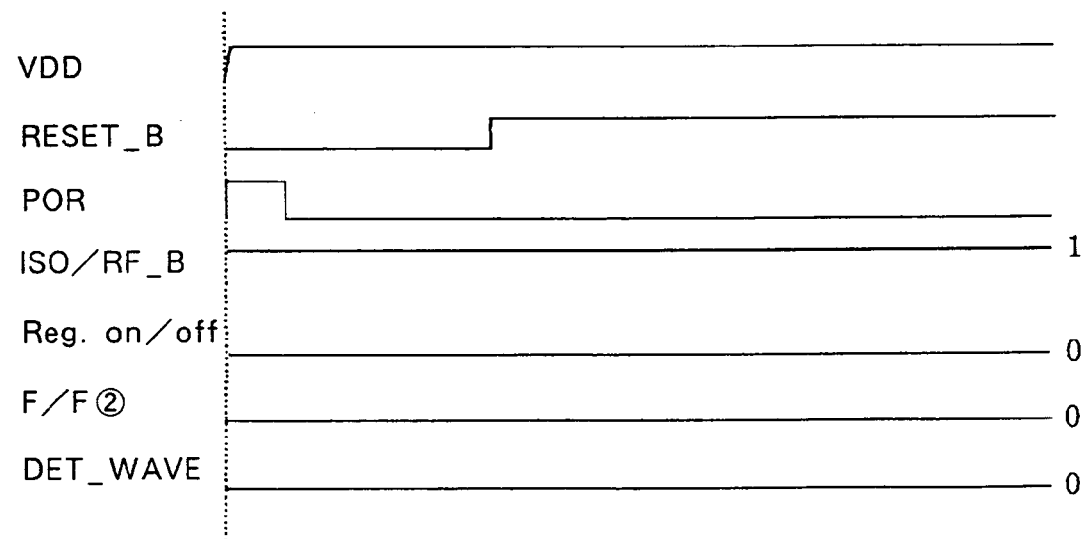
FIG. 6 is a timing chart of various signals when the IC card switches to a terminal mode based on an input applied to a connection terminal.

Operation of IC card 100 in the terminal mode will be described below. When IC card 100 is inserted into the terminal-mode card reader in the absence of undue electromagnetic noise, input signals are applied to connection terminals 102 to 106 while no radio input is applied to antennas 107. As shown in FIG. 6, drive electric power at a predetermined voltage is supplied to connection terminal 105, and POR circuit 114 outputs a POR signal in the form of a one-shot pulse to level detector 121 in response to the drive electric power. At this time, since a reset signal at "0" level is applied from connection terminal 104 to level detector 121, level detector 121 outputs "1" as mode switching signal "ISO/RF_B", indicating the terminal mode, to internal circuit 109 and the selectors 132-1 to 132-3.

As a result, the supplied mode switching signal sets the operation mode to the terminal mode in internal circuit 109, and switches selectors 132-1 to 132-3 to a state for transmitting various signals applied in the terminal mode to connection terminals 102 to 104 to internal circuit 109. Connection terminals 102 to 104 supply a clock signal, processing data, and a reset signal, respectively, to internal circuit 109, which, after being reset, processes the data in the terminal mode in response to the clock signal.

At this time, the clock signal applied through a wired connection is not supplied to data holder 123. Therefore, the output signal from data holder 123 which is supplied with the POR signal and mode switching signal "ISO/RF_B" is maintained at "0", and the held data from data holder 123 and mode switching signal "ISO/RF_B" are applied to decoder 124. Decoder 124 applies on/off signal "Reg ON/OFF" to turn off shunt regulator 112 of internal circuit 109. Shunt regulator 112 which is turned off does not limit the drive electric power supplied to internal circuit 109. Since decoder 124 outputs "0" as input detecting signal "DET_WAVE" to internal circuit 109, internal circuit 109 recognizes that no input is applied to the antennas, but only input signals are supplied to the connection terminals, with the terminal mode being set.

As described above, IC card 100 is set to the terminal mode when no radio input is applied to antennas 107 while input signals are supplied to connection terminals 102 to 106. Since internal circuit 109 recognizes that input signals are supplied from the connection terminals, but no input is supplied from the antennas, IC card 100 reliably operates in the terminal mode. While the drive electric power is stably supplied from the terminal-mode card reader to internal circuit 109, since the drive electric power is not limited by shunt regulator 112, the voltage of the stably supplied drive electric power is not unduly lowered by shunt regulator 112.

If no drive electric power is supplied to connection terminal 105 and no radio input is applied to antennas 107, then since no drive electric power is supplied to IC card 100, the IC card 100 is neither in the RF mode nor in the terminal mode, and is not in operation. If drive electric power is then supplied from one or both of connection terminal 105 and antenna 107, then in absence of a reset signal to connection terminal 104, the POR signal from POR circuit 114 sets mode switching signal "ISO/RF_B" to "0", setting internal circuit 109 to the RF mode.

In this manner, if the application of a reset signal is not detected, then the operation mode of internal circuit 109 is preferentially set to the RF mode. Consequently, a radio wave applied at arbitrary timing to antennas 107 is reliably detected, allowing internal circuit 109 to be set reliably to the RF mode.

It is possible that electromagnetic noise is applied to antennas 107 of IC card 100 while IC card 100 is being inserted in the terminal-mode card reader and operating in the terminal mode. It is also possible for the user to insert IC card 100 into the terminal-mode card reader in order to operate IC card 100 in the terminal mode when antennas 107 have been receiving electromagnetic noise. Operation of IC card 100 at the time input signals are applied to both the connection terminals and the antennas will be described below. Inasmuch as internal circuit 109 in reality analyzes the details of inputs applied to antennas 107, IC card 100 does not malfunction with general electromagnetic noise. It is therefore assumed that an RF-mode card reader which is not recognized by the user is present in the vicinity of IC card 100.

Figure 7:
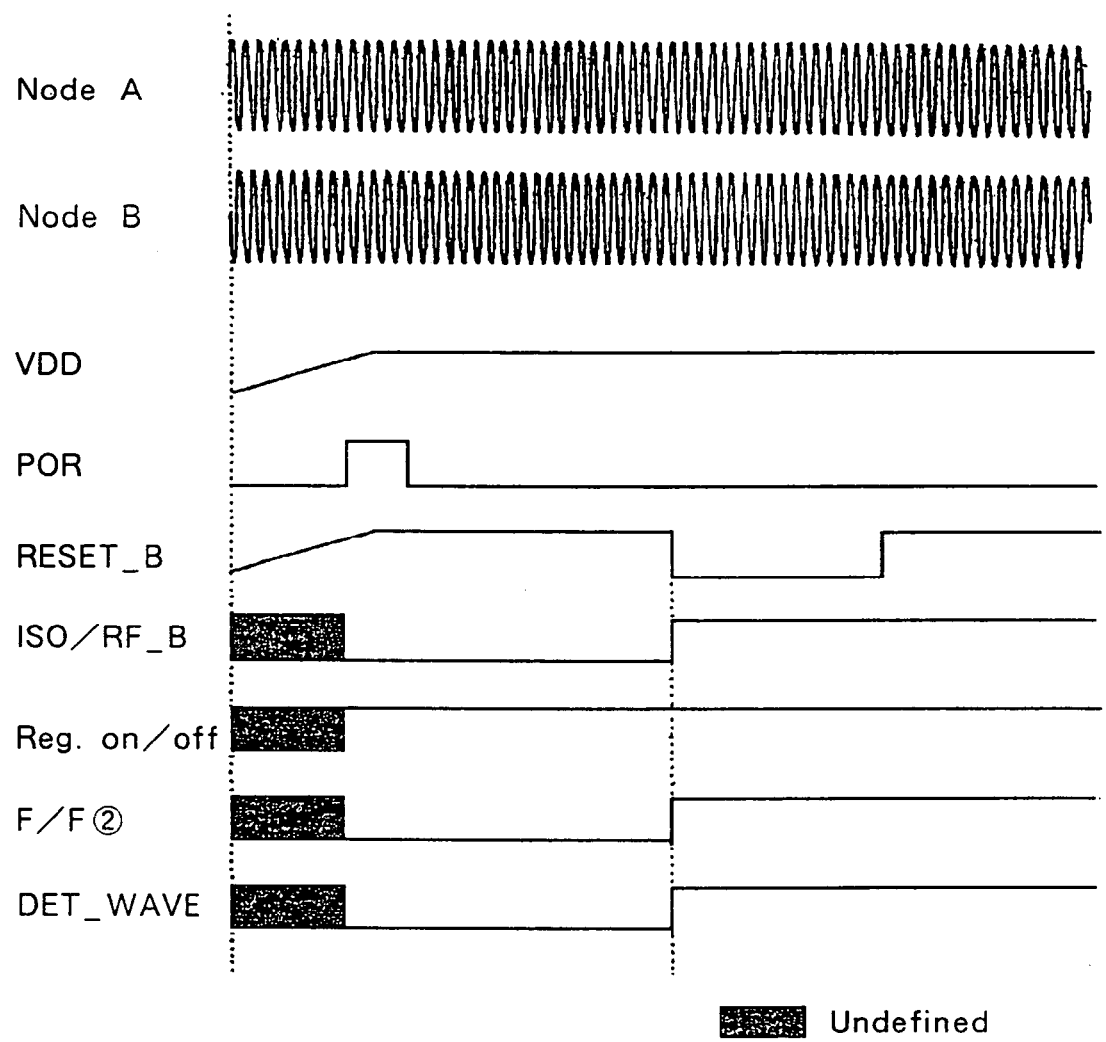
FIG. 7 is a timing chart of various signals when an input is applied via the connection terminal when the IC card is in the RF mode.

When electromagnetic noise that is not expected by the user is applied to antennas 107 of IC card 100, IC card 100 operates in the RF mode due to the applied electromagnetic noise as shown in FIG. 7. At this time, mode switching signal "ISO/RF_B" is set to "0", operating internal circuit 109 in the RF mode. On/off signal "Reg ON/OFF" turns on shunt regulator 112, and input detecting signal "DET_WAVE" is set to "0", causing internal circuit 109 to recognize that only an input is supplied from antennas 107.

When IC card 100 is then inserted into the terminal-mode card reader, input signals are applied to connection terminals 102 to 106 while an input signal is being supplied from antennas 107. Connection terminal 105 supplies drive electric power at a predetermined voltage to POR circuit 114. Since POR circuit 114 has completed the outputting of the POR signal in response to the input from antennas 107, POR circuit 114 does not output a new POR signal in response to the drive electric power from connection terminal 105. However, because connection terminal 104 applies a reset signal at "0" level to level detector 121, mode switching signal "ISO/RF_B" outputted from level detector 121 changes from "0" indicative of the RF mode to "1" indicative of the terminal mode, and is outputted to internal circuit 109 and selectors 132-1 to 132-3. As a result, the operation mode of internal circuit 109 changes from the RF mode to the terminal mode, and selectors 132-1 to 132-3 switch to a state for transmitting various signals applied in the terminal mode to connection terminals 102 to 104 to internal circuit 109.

Inasmuch as the output signal from data holder 123 changes from "0" to "1" in response to the change in mode switching signal "ISO/RF_B", input detecting signal "DET_WAVE" outputted from decoder 124 to internal circuit 109 also changes from "0" to "1". Internal circuit 109 now recognizes that an input signal has been produced for the terminal mode while IC card 100 is in the RF mode. Since On/off signal "Reg ON/OFF" outputted from decoder 124 is in an "on" state, the voltage of the drive electric power extracted from the radio wave received by antenna 107 and supplied to internal circuit 109 is kept at a predetermined voltage by shunt regulator 112.

As described above, if input signals are applied to connection terminals 102 to 106 when IC card 100 has been set to the RF mode by a radio input applied to antennas 107, IC card 100 is immediately switched to the terminal mode. Therefore, even if IC card 100 is malfunctioning due to unexpected electromagnetic noise or the like, IC card 100 becomes operational normally when it is inserted into the terminal-mode card reader by the user.

The electromagnetic noise may possibly continue to be applied to IC card 100 when IC card 100 thus operates normally. However, if the operation mode of IC card 100 changes to the terminal mode when it has been operating in the RF mode, then since shunt regulator 112 continuously operates, internal circuit 109 is protected against breakdown due to excessive drive electric power produced by the electromagnetic noise.

Figure 8:
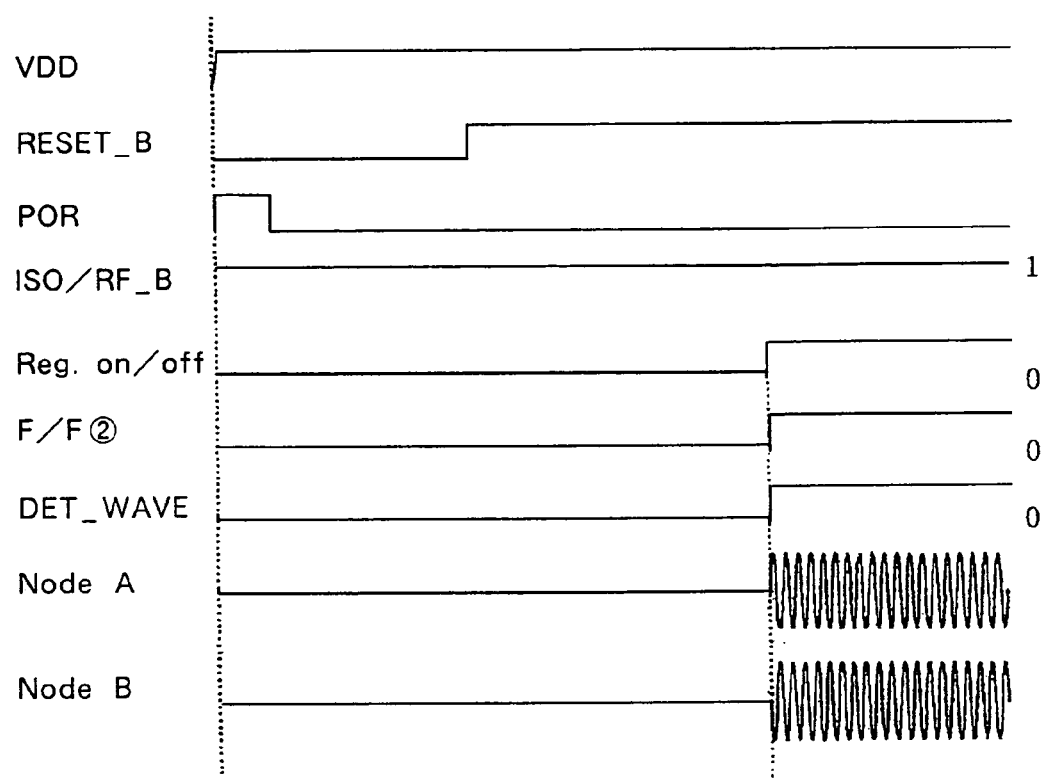
FIG. 8 is a timing chart of various signals when an input is applied via the antenna when the IC card is in the terminal mode.

Operation of IC card 100 at the time electromagnetic noise is applied to antennas 107 while IC card 100 is inserted in the terminal-mode card reader and operating in the terminal mode with no input being applied to antennas 107 will be described below. At this time, as shown in FIG. 8, IC card 100 initially operates in the terminal mode in response to input signals applied to connection terminals 102 to 106. Mode switching signal "ISO/RF_B" is at "1" level, operating internal circuit 109 in the terminal mode, on/off signal "Reg ON/OFF" turns off shunt regulator 112, and the input detecting signal "DET_WAVE" is set to "0", causing internal circuit 109 to recognize that only input signals are applied to connection terminals 102 to 106.

When electromagnetic noise is applied to antennas 107, the power extractor extracts drive electric power from the electromagnetic noise. Since POR circuit 114 has completed the outputting of the POR signal in response to the input signals from the connection terminals, POR circuit 114 does not output a new POR signal in response to a radio input signal. The reset signal supplied from connection terminal 104 to level detector 121 is maintained at "0", and mode switching signal "ISO/RF_B" outputted from level detector 121 is maintained at "1" indicative of the terminal mode. Consequently, internal circuit 109 is maintained in the terminal mode. Mode switching signal "ISO/RF_B" supplied to data holder 123 remains unchanged. A clock signal extracted from the electromagnetic noise starts being applied to data holder 120, which inverts the held data outputted therefrom to internal circuit 109. Input detecting signal "DET_WAVE" outputted from decoder 124 to internal circuit 109 also changes from "0" to "1". As a result, internal circuit 109 recognizes that an input has been produced for the RF mode while IC card 100 is in the terminal mode.

Since on/off signal "Reg ON/OFF" outputted from decoder 124 changes from an "off" state to an "on" state, the voltage of the excessive drive electric power extracted from the electromagnetic noise and supplied to internal circuit 109 is lowered to a predetermined voltage by shunt regulator 112.

Consequently, even if electromagnetic noise is applied to antennas 107 when IC card 100 has been set to the terminal mode by input signals applied to connection terminals 102 to 106, IC card 100 continuously operate in the terminal mode. Therefore, IC card 100 as it is inserted in the terminal-mode card reader by the user remains operational in the terminal mode even when unexpected electromagnetic noise is applied to antennas 107. When electromagnetic noise is applied to antennas 107 while IC card 100 is operating in the terminal mode, shunt regulator 112 is immediately turned on with IC card 100 continuing to operate in the terminal mode. Thus, internal circuit 109 is protected against breakdown due to excessive drive electric power produced by the electromagnetic noise.

As described above, IC card 100 can switch between the RF mode and the terminal mode depending on an input to the antennas and input signals to the connection terminals. When IC card 100 is set to one of the modes, even if an input signal is produced for the other mode, IC card 100 is set to an appropriate mode. Particularly, since the switching between the two modes is performed based on whether a reset signal is applied to connection terminal 104 or not, no analog operation such as voltage comparison is required for mode switching. Consequently, IC card 100 performs a clear-cut control process for mode switching, and the control process does not vary due to errors and variations in diffusing conditions in the fabrication of semiconductor integrated circuits contained in IC card 100. IC card 100 is capable of recognizing that the RF mode and the terminal mode are set depending on an input signal to either the antennas or the connection terminals, the operation mode has changed to the terminal mode while IC card 100 is operating in the RF mode, and an input is applied to the antennas while IC card 100 is operating in the terminal mode. Therefore, internal circuit 109 can detect and record input signals different from ordinary input signals, and the recorded input signals can be used to find out causes of malfunctions and failures. When an input is applied to the antennas, IC card 100 immediately turns on shunt regulator 112 irrespective of whether IC card 100 is presently set to the RF mode or the terminal mode. Consequently, internal circuit 109 is reliably protected against destruction due to an excessive voltage produced from electromagnetic noise.

While combined IC card 100 has been illustrated as the data processing device, the principles of the present invention are also applicable to various devices which are capable of switching between the RF mode and the terminal mode.

While a preferred embodiment of the present invention has been described using specific terms, such description is for illustrative purposes only, and it is to be understood that changes and variations may be made without departing from the spirit or scope of the following claims.

What is claimed is:

1. A data processing device comprising:
   a plurality of connection terminals for establishing electric contact to receive signals and drive electric power, one of said connection terminals comprising a reset terminal;
   an antenna for receiving signals and drive electric power as a radio wave;
   data processing means switchable between a terminal mode for processing data based on an effective input signal applied to said connection terminals and an RF mode for processing data based on an effective input signal applied to said antenna, said data processing means being supplied with said signals and drive electric power from one of said connection terminals and said antenna depending on one of said terminal mode and said RF mode which is set; and
   mode switching means for setting said data processing means to said RF mode in response to a predetermined radio wave applied to said antenna and setting said data processing means to said terminal mode in response to a reset signal applied to said reset terminal.

2. A data processing device according to claim 1, wherein said mode switching means comprises means for setting said data processing means to said RF mode when no reset signal is detected.

3. A data processing device according to claim 1, wherein said mode switching means comprises means for detecting whether the reset signal is applied to said reset terminal or not while said data processing means is being set to said RF mode.

4. A data processing device according to claim 2, wherein said mode switching means comprises means for detecting whether the reset signal is applied to said reset terminal or not while said data processing means is being set to said RF mode.

5. A data processing device according to claim 4, further comprising a power line and a pull-up resistor, wherein said reset terminal is connected to said power line through said pull-up resistor.

6. A data processing device according to claim 4, wherein said mode switching means comprises means for setting said data processing means to said terminal mode when the reset signal applied to said reset terminal is detected even while said data processing means has been set to said RF mode in response to said predetermined radio wave applied to said antenna.

7. A data processing device according to claim 1, wherein said mode switching means comprises means for detecting said predetermined radio wave applied to said antenna even while said data processing means has been set to said terminal mode.

8. A data processing device according to claim 4, wherein said mode switching means comprises means for detecting said predetermined radio wave applied to said antenna even while said data processing means has been set to said terminal mode.

9. A data processing device according to claim 1, further comprising:
   power extracting means for extracting drive electric power from a radio wave applied to said antenna;
   power limiting means for limiting voltage of the drive electric power extracted by said power extracting means to a predetermined voltage; and
   limiting control means for turning off said power limiting means when said data processing means has been set to said terminal mode.

10. A data processing device according to claim 4, further comprising:
    power extracting means for extracting drive electric power from a radio wave applied to said antenna;
    power limiting means for limiting voltage of the drive electric power extracted by said power extracting means to a predetermined voltage; and
    limiting control means for turning off said power limiting means when said data processing means has been set to said terminal mode.

11. A data processing device according to claim 9, wherein said mode switching means comprises means for detecting an input signal applied to said antenna even while said data processing means has been set to said terminal mode, and said limiting control means comprises means for turning on said power limiting means if said mode switching means detects an input signal applied to said antenna when said data processing means has been set to said terminal mode and said power limiting means has been turned off.

12. A data processing device according to claim 10, wherein said mode switching means comprises means for detecting an input signal applied to said antenna even while said data processing means has been set to said terminal mode, and said limiting control means comprises means for turning on said power limiting means if said mode switching means detects an input signal applied to said antenna when said data processing means has been set to said terminal mode and said power limiting means has been turned off.

13. A method of controlling operation of a data processing device having a plurality of connection terminals for establishing electric contact to receive signals and drive electric power, one of said connection terminals comprising a reset terminal, an antenna for receiving signals and drive electric power as a radio wave, and data processor switchable between a terminal mode for processing data based on an effective input signal applied to said connection terminals and an RF mode for processing data based on an effective input signal applied to said antenna, said data processor being supplied with said signals and drive electric power from one of said connection terminals and said antenna depending on one of said terminal mode and said RF mode which is set, said method comprising the steps of:

setting said data processor to said RF mode in response to a predetermined radio wave applied to said antenna; and setting said data processor to said terminal mode in response to a reset signal applied to said reset terminal.

* * * * *